(12) United States Patent
Goodenough et al.

(10) Patent No.: US 10,290,868 B2
(45) Date of Patent: May 14, 2019

(54) CATHODES FOR RECHARGEABLE LITHIUM-ION BATTERIES

(75) Inventors: John B. Goodenough, Austin, TX (US); Kyu-Sung Park, Suwon (KR); Steen Schougaard, Glostrup (DK)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 13 days.

(21) Appl. No.: 11/447,510

(22) Filed: Jun. 1, 2006

(65) Prior Publication Data

US 2007/0082267 A1    Apr. 12, 2007

Related U.S. Application Data

(60) Provisional application No. 60/686,719, filed on Jun. 1, 2005.

(51) Int. Cl.
| | |
|---|---|
| *H01M 4/48* | (2010.01) |
| *H01M 4/485* | (2010.01) |
| *H01M 4/131* | (2010.01) |
| *H01M 4/136* | (2010.01) |
| *H01M 4/137* | (2010.01) |
| *H01M 4/36* | (2006.01) |

(Continued)

(52) U.S. Cl.
CPC ......... *H01M 4/485* (2013.01); *H01M 4/131* (2013.01); *H01M 4/136* (2013.01); *H01M 4/137* (2013.01); *H01M 4/364* (2013.01); *H01M 4/366* (2013.01); *H01M 4/505* (2013.01); *H01M 4/5825* (2013.01); *H01M 4/60* (2013.01); *H01M 4/608* (2013.01); *H01M 10/0525* (2013.01); *H01M 10/052* (2013.01)

(58) Field of Classification Search
None
See application file for complete search history.

(56) References Cited

U.S. PATENT DOCUMENTS

| | | | |
|---|---|---|---|
| 5,910,382 A | 6/1999 | Goodenough et al. | |
| 6,004,688 A | 12/1999 | Goodenough et al. | |

(Continued)

FOREIGN PATENT DOCUMENTS

| | | |
|---|---|---|
| DE | 10 2005 022 434 A1 | 11/2006 |
| EP | 0 818 839 A2 | 1/1998 |

(Continued)

OTHER PUBLICATIONS

Naji et al, "Preparation of Membranes by Electropolymerization of Pyrrole Functionalized by a Ferrocene Group", Journal of Applied Polymer Science, vol. 91, p. 3947-3958, 2004.*

(Continued)

*Primary Examiner* — Ula C Ruddock
*Assistant Examiner* — Tony S Chuo
(74) *Attorney, Agent, or Firm* — Meunier Carlin & Curfman LLC

(57) ABSTRACT

The present invention includes an apparatus and method of making and using a composition that includes the replacement of electrochemically inactive additives with a conductive and electrochemically active polymer that is attached so as to make an electrical contract to the redox couples of the electrochemically active oxide particles into/from which Lithium is reversibly inserted/extracted in a battery discharge/charge cycle.

23 Claims, 7 Drawing Sheets

(51) Int. Cl.
*H01M 4/505* (2010.01)
*H01M 4/58* (2010.01)
*H01M 4/60* (2006.01)
*H01M 10/0525* (2010.01)
*H01M 10/052* (2010.01)

(56) References Cited

U.S. PATENT DOCUMENTS

| | | | |
|---|---|---|---|
| 6,221,812 B1 | 4/2001 | Zhou et al. | |
| 6,391,493 B1 | 5/2002 | Goodenough et al. | |
| 6,514,640 B1 | 2/2003 | Armand et al. | |
| 6,770,397 B1* | 8/2004 | Maeda et al. | 429/217 |
| 6,855,273 B2 | 2/2005 | Ravet et al. | |
| 7,651,647 B1* | 1/2010 | Strange | H01M 4/624 264/104 |
| 2002/0041995 A1* | 4/2002 | Bannai et al. | 429/213 |
| 2002/0195591 A1* | 12/2002 | Ravet et al. | 252/500 |
| 2004/0018430 A1* | 1/2004 | Holman et al. | 429/233 |
| 2004/0033360 A1* | 2/2004 | Armand et al. | 428/408 |
| 2004/0253520 A1* | 12/2004 | Wensley et al. | 429/306 |
| 2005/0008934 A1* | 1/2005 | Oyama et al. | 429/213 |

FOREIGN PATENT DOCUMENTS

| | | | |
|---|---|---|---|
| EP | 1 881 544 A1 | 1/2008 | |
| JP | 2001-351634 | 12/2001 | |
| JP | 2002-216770 | 8/2002 | |
| JP | 2003-059491 * | 2/2003 | H01M 4/58 |
| JP | 2003323892 | 11/2003 | |
| WO | 2005000956 A2 | 1/2005 | |
| WO | 2006130766 | 12/2006 | |

OTHER PUBLICATIONS

Wang, G. X., et al., "An investigation of polypyrrole-LiFePO4 composite cathode materials for lithium-ion batteries," Electrochim Acta (2005), 50:4649-4654.

International Search Report and Written Opinion for PCT/US2006/021277 dated Mar. 28, 2008.

Extended European Search Report for 06771838.7, dated Jan. 17, 2012, 6 pages.

* cited by examiner a b

CATHODES FOR RECHARGEABLE LITHIUM-ION BATTERIES

CROSS-REFERENCE TO RELATED APPLICATIONS

This application claims priority to U.S. Provisional Application Ser. No. 60/686,719, filed Jun. 1, 2005, the contents of which are incorporated by reference herein in its entirety.

The U.S. Government may own certain rights in this invention pursuant to the terms of the Lawrence Berkeley National Laboratory grant number 6517420.

TECHNICAL FIELD OF THE INVENTION

The present invention relates generally to rechargeable batteries, and in particular, to materials for use as electrodes for an alkali-ion battery.

BACKGROUND OF THE INVENTION

Without limiting the scope of the invention, its background is described in connection with electrode materials for use in a system, method and apparatus, as an example.

The rechargeable lithium-ion batteries (hereinafter collectively referred to as a "Secondary Cell") are characterized by small size and high output voltage, allowing them to be used in a variety of devices, e.g., portable electronic devices such as cellular phones, laptop computers, digital video recorders and cordless power tools. The charge/discharge step in Secondary Cells is the result of exchange of lithium ions between a cathode and an anode. Generally, the main principle behind the chemical reaction is one where lithium in the positive electrode material is ionized during charge and moves to the negative electrode, while during discharge the Li ions move to the positive electrode.

In Secondary Cells, the action of charge/discharge is done through exchange of lithium ions between cathode and anode, thus the electrode composition is more important for deciding the battery performance. Secondary Cell performance is greatly affected by the composition of the cathode; and as a result, the cathode composition has been the subject of intensive research and development to examine electrode materials that optimize the discharge capacity, charge-discharge voltage, cycle life characteristics and storage characteristics.

The discharge capacity is a function of the amount of lithium ion exchanged whereas the discharge voltage is defined by materials and its crystal structures. As a result, cathodes materials common in the art include transition-metal oxide containing lithium, e.g., layered oxides such as lithium cobalt oxide ($Li_xCoO_2$), spinels such as lithium manganese spinel ($Li_xMn_2O_4$) and olivines such as a lithium ion phosphate ($Li_xFe(PO_4)$).

Conventional lithium-ion Secondary Cells use a carbon black or coke material into which lithium is inserted reversibly as the anode and a layered or framework transition-metal oxide is used as the cathode host material. The general structure of the electrode provides interstitial space for reversible lithium-ion insertion and extraction.

An electrochemically inactive material (e.g., carbon black or coke) that is chemically inert, conductive, soft and light-weight (normally carbon black) is added to a cathode material in order to maintain electrical contact between the small, dispersed transition-metal oxide cathode particles and the particles of the external circuit. Current technology also uses a binder (normally PTFE) as a cathode material additive in order to hold the composite cathode mass together, while allowing the electrolyte access to the surfaces of the oxide particles.

The foregoing stratigies have been recognized for many years; and while numerous solutions have been proposed, none of them adequately address the problem of optimizing the several functions of the composite cathode; viz. (1) allowing access of the electrolyte to the surface of the electrochemically active transition-metal oxide, (2) providing electrical contact between particles and between the particles and the current collector, and (3) holding the cathode mass together during repeated charge/discharge cycles. Moreover, substituting a conductive, electrochemically active, and electrically attached material for the electrochemically inactive, physically attached carbon black and PTFE would also enhance the capacity as well as the cycle life of the battery.

SUMMARY OF THE INVENTION

The inventors recognized the need for an electrodes material that enhances the capacity, cycle life, and rate of discharge/charge of an oxide cathode.

The present invention replaces the electrochemically inactive carbon-black conductor and the PTFE binder by combining their functions in a single, electrochemically active and conductive polymer/copolymer that makes electrical contact by attachment to the redox couple of an electrochemically active, transition-metal oxide and/or transition-metal complex as well as to the current collector.

While other attempts have been made to use conducting polymers as electrode materials for rechargeable batteries, the inventors used chemical enhancement of the polymers to overcome the principle disadvantages previously encountered, such as low specific capacity (amount of Lithium per gram that can be absorbed reversibly) and wide voltage variance as a function of the charge state of the battery.

The invention increases the charge capacity and reduces the overvoltages at high discharge rates of lithium-ion batteries. Furthermore, the invention improves the reliability of lithium-ion batteries. Thus, the invention enables new lithium-ion batteries to weigh less and discharge/recharge faster than present lithium-ion batteries of the same charge capacity. Alternatively, the invention enables new lithium-ion batteries to power portable electronic devices for longer periods of time than present lithium-ion batteries of the same weight.

For example, the present invention includes a rechargeable electrochemical cell having an anode and a cathode in communication with an electrolyte. The cathode including a conductive polymer electrically attached to one or more transition-metal oxides and wherein Lithium is inserted/extracted reversibly into/from the one or more transition-metal oxides.

Another example of the present invention includes a cathode having a conductive polymer in contact with a carbon coated oxide having the formula C—$LiMPO_4$, wherein Lithium is reversibly inserted/extracted into/from a carbon-coated $LiMPO_4$ compound. Another cathode of the present invention includes a conductive polymer having one or more transition-metal oxides, wherein the Lithium is reversibly inserted/extracted into/from one or more transition-metal oxides.

The present invention also provides a battery having an anode and a cathode in communication with an electrolyte, wherein the cathode includes a conductive polymer chemically attached to one or more transition-metal oxides. The Lithium is reversibly inserted/extracted into/from one or more transition-metal oxides.

In addition the present invention includes a method of storing electricity rechargeably, including supplying electricity to a rechargeable electrochemical cell having an anode and a cathode in communication with an electrolyte. The cathode includes a conductive polymer attached to one or more transition-metal oxides and wherein Lithium is inserted/extracted reversibly into/from one or more transition-metal oxides. In some embodiments the conductive polymer includes [(ferrocenyl)amidopropyl]pyrrole.

BRIEF DESCRIPTION OF THE DRAWINGS

For a more complete understanding of the features and advantages of the present invention, reference is now made to the detailed description of the invention along with the accompanying figures and in which:

FIG. 3a depicts an apparatus for fabrication of a PPy/oxide composite anode by electrodeposition, while

DETAILED DESCRIPTION OF THE INVENTION

Figure 1:
FIG. 1a is a an illustration the structure of pyrrole and of a ferrocenyl complex tethered to a pyrrole by an amidopropyl chain and FIG. 1b illustrates a polypyrrole polymer having pyrrole and [(ferrocenyl)amidopropyl]pyrrole units.
Figure 1:
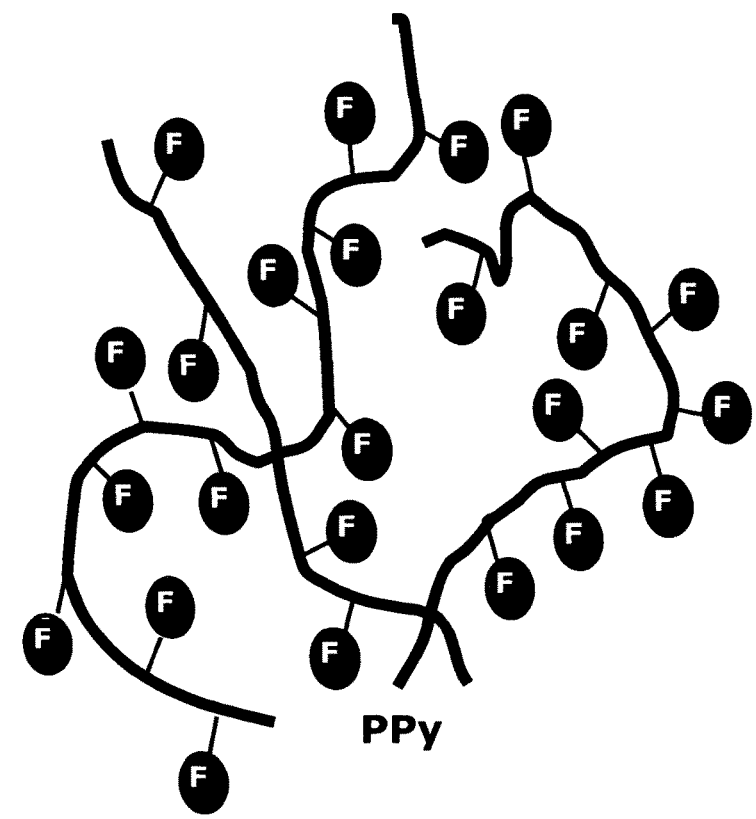

While the making and using of various embodiments of the present invention are discussed in detail below, it should be appreciated that the present invention provides many applicable inventive concepts that can be embodied in a wide variety of specific contexts. The terminology used and specific embodiments discussed herein are merely illustrative of specific ways to make and use the invention and do not delimit the scope of the invention.

To enhance capacity and rate capability the present invention replaces the electrochemically inactive additives (e.g., C and PTFE) of conventional cathode by active polymer. The use of the integrated cathode material advocated by the present invention, while advantageous from an operating perspective, does add some complexity to the electrode manufacturing process. However, since the present method of manufacturing composite cathodes is itself complex, requiring the selective combination of transition-metal oxide particles, a soft conductor like carbon black, and a binding agent like PTFE, the marginal increase in complexity required to manufacture the integrated cathode material of this invention is an insignificant tradeoff for the performance benefits gained when the integrated cathode material is used.

Present-day secondary (rechargeable) lithium batteries use a solid reductant as the anode and a solid oxidant as the cathode. It is important that the chemical reactions at the anode and cathode of a lithium secondary battery be reversible. On discharge, the metallic anode supplies $Li^+$ ions to the $Li^+$-ion electrolyte and electrons to the external circuit. The cathode is a host compound into/from which the working $Li^+$ ion of the electrolyte can be inserted/extracted reversibly as a guest species over a large solid-solubility range (Goodenough 1994) (see generally U.S. Pat. No. 5,910,382 to Goodenough, et al. incorporated herein by reference). When the $Li^+$ ions are inserted as a guest species is into the cathode, they are charge-compensated by electrons from the external circuit. On charge, the removal of electrons from the cathode by an external field releases $Li^+$ ions back to the electrolyte to restore the parent host structure. The resultant addition of electrons to the anode by the external field attracts charge-compensating $Li^+$ ions back into the anode to restore it to its original composition.

The present invention provides new materials for use as cathodes in lithium secondary (rechargeable) batteries. It will be understood that the anode for use with the cathode material of the invention may be any lithium anode material, such as a host for lithium or elemental lithium itself. Preferably, the anode material will be a host for lithium insertion/extraction. Where both the anode and cathode are hosts for the reversible insertion or removal of the working ion into/from the electrolyte, the electrochemical cell is commonly called a "rocking-chair" cell. An implicit additional requirement of a secondary battery is maintenance not only of the electrode/electrolyte interfaces, but also of electrical contact between host particles and between these particles and the current collector throughout repeated discharge/recharge cycles.

The redox couples of interest for a cathode are associated with antibonding states of d-orbital parentage at transition-metal cations M or 4f-orbital parentage at rare-earth cations Ln in an oxide. The stronger is the cation-anion covalent mixing, the higher is the energy of a given redox couple. Modulation of the strength of the cation-anion covalence at a given M or Ln cation by nearest-neighbor cations that compete for the same anion valence electrons is known as the inductive effect. Changes of structure alter primarily the Madelung energy as is illustrated by raising of the redox energy within a spinel $[M_2]O_4$ framework by about 1 eV on transfer of $Li^+$ ions from tetrahedral to octahedral interstitial sites. Changing the counter cation, but not the structure, alters primarily the inductive effect, as is illustrated by a lowering of the $Fe^{3+}/Fe^{2+}$ redox energy by 0.6 eV on changing $(MoO_4)^{2-}$ or $(WO_4)^{2-}$ to $(SO_4)^{2-}$ polyanions in isostructural $Fe_2(XO_4)_3$ compounds. Raising the energy of a given redox couple in a cathode lowers the voltage obtained from cells utilizing a common anode. Conversely, lowering the redox energy of a cathode raises the cell voltage with respect to a common anode.

The invention provides new cathode materials containing oxide polyanions, including the oxide polyanion $(PO_4)^{3-}$ as at least one constituent, for use in secondary (rechargeable)

batteries. For example, the cathode materials of the presented invention may have the general formula $LiM(PO_4)$ with the ordered olivine structure or the more open rhombohedral NASICON framework structure of general formula $M_2(XO_4)_3$. The cathode materials of the present invention have the general formula $LiM(PO_4)$ for the ordered olivine structure or for the rhombohedral NASICON framework structure, $A_xM_2(PO_4)_y(XO_4)_{3-y}$, where $0<y$, M is a transition-metal atom, A is Li or Na and X is Si, As or S and acts as a counter cation.

Insertion of lithium into carbon-coated $C-FePO_4$ was reversible over the several cycles studied. The $Li_xFePO_4$ material of the present invention represents a cathode of good capacity and contains inexpensive, environmentally benign elements. With small oxide particles attached to the conductive PPy polymer, high rates of charge and discharge are realized over the range of ambient temperatures that a rechargeable Lithium battery is expected to encounter. The output voltage remains flat with little decrease as the discharge rate is increased; the capacity loss at higher rates of discharge is reversible, i.e., is recovered on cycling at lower rates.

Generally, in one aspect, the invention provides an ordered olivine compound having the general formula $LiMPO_4$, where M is at least one first row transition-metal cation. The alkali ion $Li^+$ may be inserted/extracted reversibly from/to the electrolyte of the battery into/from the interstitial space of the host $MPO_4$ framework of the ordered-olivine structure as the transition-metal M cation (or combination of cations) is reduced/oxidized by charge-compensating electrons supplied/removed by the external circuit of the battery in a discharge/charge cycle. In particular, M may be Mn, Fe, Co, Ti, Ni or a combination thereof. Examples of combinations of the transition-metals for use as M include, but are not limited to, $Fe_{1-x}Mn_x$, where $0<x<1$.

Additional formulas for the ordered olivine electrode compounds include, but are not limited to, $LiFePO_4$, $LiMnPO_4$, $LiCoPO_4$, $LiNiPO_4$, and mixed transition-metal compounds such as $LiFe_{1-x}Mn_xPO_4$, where $0<x<1$. However, it will be understood by one of skill in the art that other compounds having the general formula $LiMPO_4$ and an ordered olivine structure are included within the scope of the invention.

Redox energies of the host M cations can be varied by a suitable choice of the $XO_4$ polyanion, where X is taken from Si, P, As, or S and the structure may contain a combination of such polyanions. Tuning of the redox energies allows optimization of the battery voltage with respect to the electrolyte used in the battery. Replacement of the oxide ion $O^{2-}$ of conventional cathode materials by a polyanion $(XO_4)^{m-}$ to take advantage of (1) the larger size of the polyanion, which can enlarge the free volume of the host interstitial space available to the alkali ions, and (2) the covalent X—O bonding, which stabilizes the redox energies of the M cations with M-O—X bonding so as to create acceptable open-circuit voltages with environmentally benign $Fe^{3+}/Fe^{2+}$ and/or $V^{4+}/V^{3+}$ redox couples.

One example of polymeric material that may be used in the present invention includes pyrrole ($C_4H_4NH$), which contains both unsaturated carbon bonds and nitrogen. The nitrogen is part of a five-member aromatic ring. In addition derivatives of Pyrrole may be used, e.g., [(ferrocenyl)amidopropyl]pyrrole. Generally, polymerized pyrrole is a good organic conductor and polypyrrole (PPy), is stable under normal operating conditions of temperature, load, voltage and current. One embodiment of the present invention includes a 50/50 ration of [(ferrocenyl)amidopropyl]pyrrole to pyrrole.

Any conductive polymer suitable for forming a suspension in aqueous media may be used. Examples of suitable conductive polymers include polypyrrole, polyaniline and polythiophene or derivatives thereof. Other examples of such suitable polymers include, but are not limited to, polypyrrole, polyaniline, polythiophene, [(ferrocenyl)amidopropyl]pyrrole, polyfuran and derivatives thereof. Such polymers are prepared from the monomers pyrrole, aniline, thiophene, furan, thiophene, [(ferrocenyl) amidopropyl]pyrrole and furan: or from a copolymer including a structural polymer selected from polystyrene, polyacrylate, polyurethane and derivatives thereof. Additional components that may be added to the conductive polymer colloidal compositions include oxidants, additional conductive particles, preservatives and stabilizers. Oxidants are employed to initiate polymerization between monomers in the colloidal compositions. Any suitable oxidant used to initiate polymerization between monomers may be employed.

Additional examples of polymers include polymers containing conjugated regions, or composed entirely, of repeating units which are substituted or unsubstituted aniline, thiophene, pyrrole, and/or phenyl mercaptan ($C_6H_5SH$), polyaniline, polythiophene, polypyrrole, poly(p-phenylene sulfide), and copolymers of these polymers. Polymers useful in the present invention also include polymers of any of the corresponding monomers which are ring-substituted with one or more straight or branched alkyl, alkoxy, or alkoxyalkyl groups, which can contain from 1 up to about 30 carbon atoms, particularly where such substituents are cross-linkable with each other as described in more detail hereinbelow. It will also be recognized that polymers incorporated within the compositions of matter of the present invention may also be copolymers of any one or more of such monomers with other comonomers having ethylenic unsaturation, including but not limited to ethylene, propylene, vinyl chloride, styrene, vinyl alcohol, vinyl acetate and combinations thereof.

Carbon coating of the oxide particle allows an attachment of the conductive polymer to the oxide particle to give electrical conduction between the polymer and the redox couple of the oxide. One method of making the Ppy/C—$LiFePO_4$, where C—$LiFePO_4$ designates carbon-coated $LiFePO_4$ particles, electrode is through electrodeposition. For example, a three-electrode cell can be used both for electrodeposition and subsequent cyclic voltammetry experiments. Normally, one or more polymers are deposited potentiostatically onto a micro-electrode (e.g., platinum electrode) in the form of 'thick' films, e.g., 15-20 μm in depth. A platinum flag can act as the counter electrode. A silver flag or a commercial Ag/AgCl electrode can served as a reference electrode. Persons of ordinary skill in the art will recognize that the electrode may be fabricated using other methods.

Additionally, the incorporation of an oxide into a polypyrrole matrix allows elimination of the inactive carbon-black and TEFLON binder from a conventional cathode, which increases the specific capacity and rate capability while lowering the overpotentials at high discharge rates. PPy/ferrocene films of the present invention had specific capacities up to 65 mAh/g with a short plateau near 3.5 V vs $Li^+/Li^0$ due to the Fe(III)/Fe(II) redox couple of the ferrocene group.

The present invention includes a rechargeable electrochemical cell having an anode and a cathode in communication with an electrolyte, wherein the cathode includes a conductive polymer attached to one or more transition-metal oxides and wherein Lithium is reversibly inserted/extracted into/from the one or more transition-metal oxides.

The one or more transition-metal oxides may be $LiMPO_4$. Other compounds may include $LiFe(PO_4)$, $Li_3Fe_2(PO_4)_3$, $LiNi_{0.5+\delta}Mn_{0.5+\delta}O_2$, $LiNi_{2/3}Mn_{1/3}O_2$, $Li_{3-n}Fe_{2-n}Ti_n(PO_4)_3$. $LiFePO_4$; $LiNi_{0.5+\delta}Mn_{0.5+\delta}O_2$ ($0 \leq \delta \leq 1/6$); and nanowires of these oxides or combinations thereof.

In embodiments having the composition $LiMPO_4$ the M is a cation of a metal selected from the group consisting of Fe, Mn, Co, Ti, Ni or mixtures thereof. The conductive polymer may include any conductive polymer and may contain monomers of the same or different compositions. For example, the conductive polymer of the present invention may be [(ferrocenyl)amidopropyl]pyrrole, pyrrole or a combination thereof. In one embodiment the ratio of [(ferrocenyl)amidopropyl]pyrrole to pyrrole is 50/50; however other ratios may be used. The conductive polymer may also include polypyrrole, polyaniline, polythiophene, polyfuran or mixtures thereof.

Another example of the present invention includes a cathode having a conductive polymer in contact with a compound having a formula $LiMPO_4$, wherein Lithium is reversibly inserted/extracted into/from the oxide. Another cathode of the present invention includes a conductive polymer and one or more transition-metal oxides, wherein Lithium is reversibly inserted/extracted into/from the one or more transition-metal oxides.

The present invention also provides a battery having an anode and a cathode in communication with an electrolyte, wherein the cathode includes a conductive polymer and one or more transition-metal oxides, wherein Lithium is reversibly inserted/extracted into/from the one or more transition-metal oxides.

The battery of the present invention may have one or more transition-metal oxides in the form of $LiMPO_4$. Other compounds may include a spinel like $Li[Li_yMn_{2-y-x}Ni_xO_{4-\delta}F_\delta]$, $Li_3Fe_2(PO_4)_3$, or $LiNi_{0.5+\delta}Mn_{0.5-\delta}O_2$, ($0 \leq \delta \leq 1/6$); in the form of particles or nanowires. In embodiments having the composition $LiMPO_4$ the M is a cation of a metal selected from the group consisting of Fe, Mn, Co, Ni or mixtures thereof. The conductive polymer used in the battery of the present invention may include any conductive polymer and may contain monomers of the same or different compositions. For example, the conductive polymer of the present invention may be [(ferrocenyl)amidopropyl]pyrrole, pyrrole or a combination thereof. In one embodiment, the ratio of [(ferrocenyl)amidopropyl]pyrrole to pyrrole is 50/50; however other ratios may be used.

In addition the present invention includes a method of storing rechargeably electricity including supplying electricity to a rechargeable electrochemical cell having an anode and a cathode in communication with an electrolyte. The cathode includes a conductive polymer and one or more transition-metal oxides and wherein Lithium is reversibly inserted/extracted into/from one or more transition-metal oxides. In some embodiments, the conductive polymer includes [(ferrocenyl)amidopropyl]pyrrole, pyrrole or a combination thereof.

Figure 2:
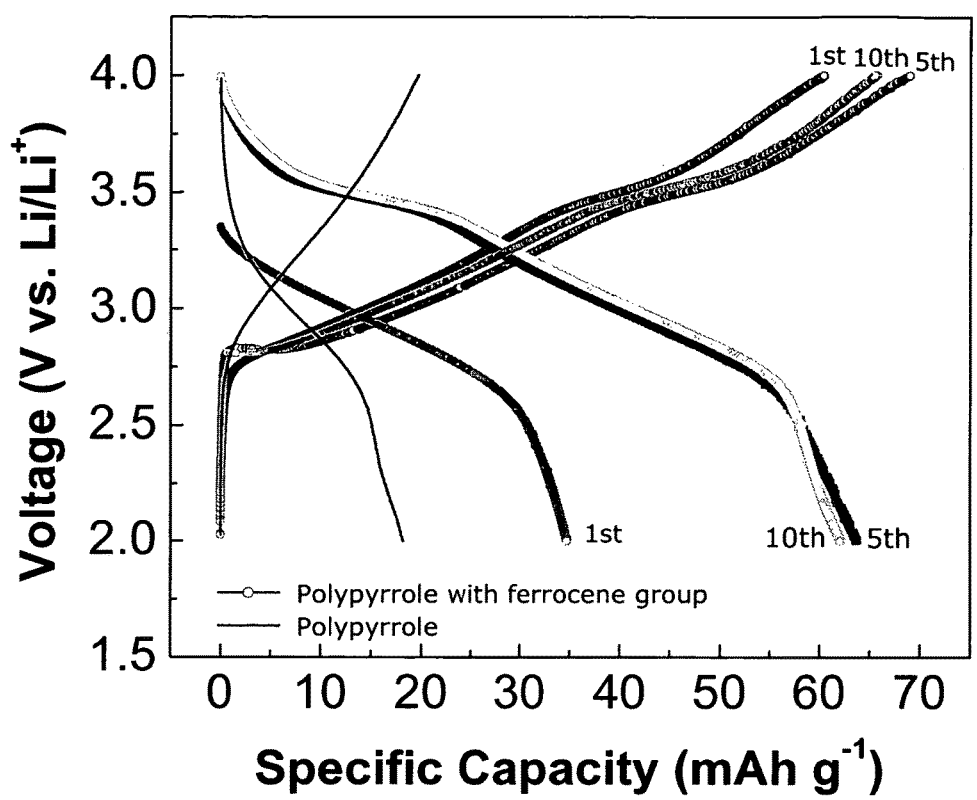
FIG. 2 is a graph of the voltage verses state of charge in a charge/discharge cycle for a cell with a Lithium anode and a cathode of polypyrrole (PPy) polymer having ferrocene tethered to half of the pyrrole units.
Figure 3A:
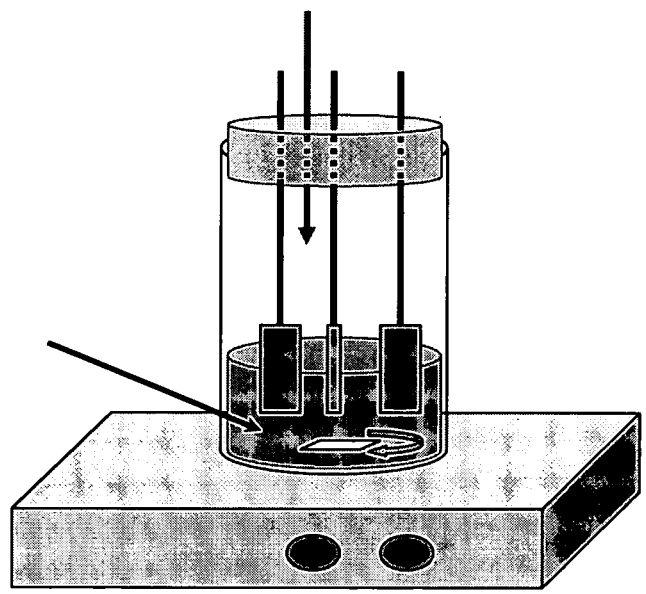
Figure 3B:
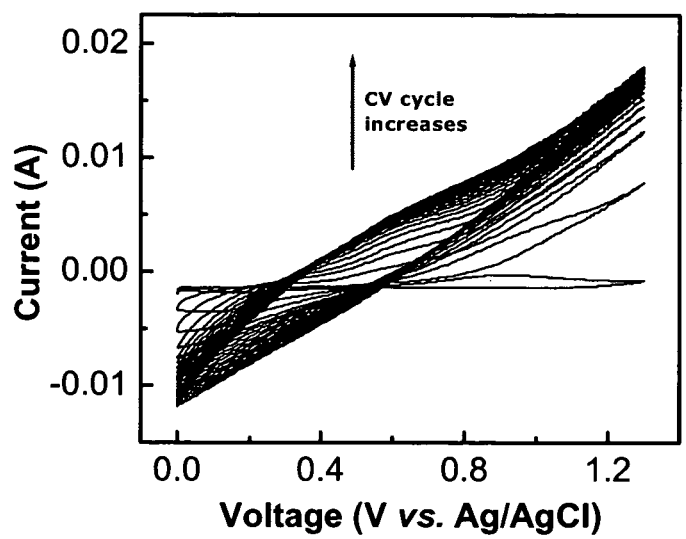
FIG. 3b is a graph of several cycles shown in a typical voltammogram.

FIG. 1 is an illustration of the monomers and PPy chains of the conductive polymer of the present invention. FIG. 1a illustrates the structure of [(ferrocenyl)amidopropyl]pyrrole and pyrrole, while FIG. 1b illustrates the structure of the PPy chains with tethered ferrocene molecules. FIG. 2 is a graph of the voltage verses the state of charge for electrodes of the present invention. FIG. 3 illustrates an apparatus for electrode fabrication by electrodeposition of the present invention and the corresponding cyclic voltammogram of the electrodeposition process.

Figure 4:
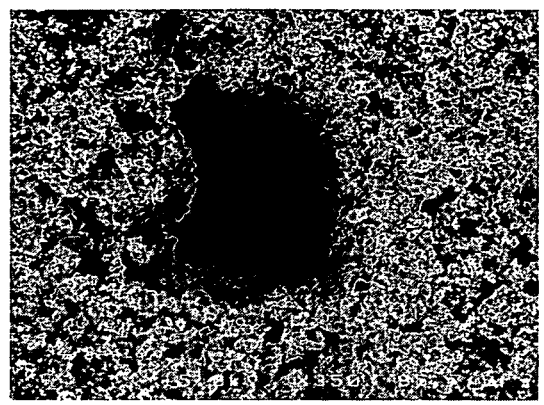
FIG. 4 is a SEM image of the C—$LiFePO_4$/PPy composite cathode of the present invention.
Figure 4:
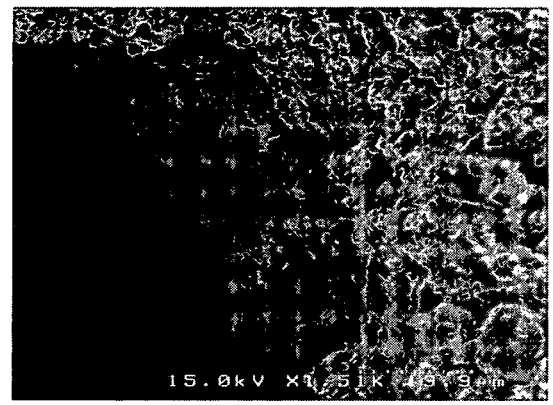
Figure 5:
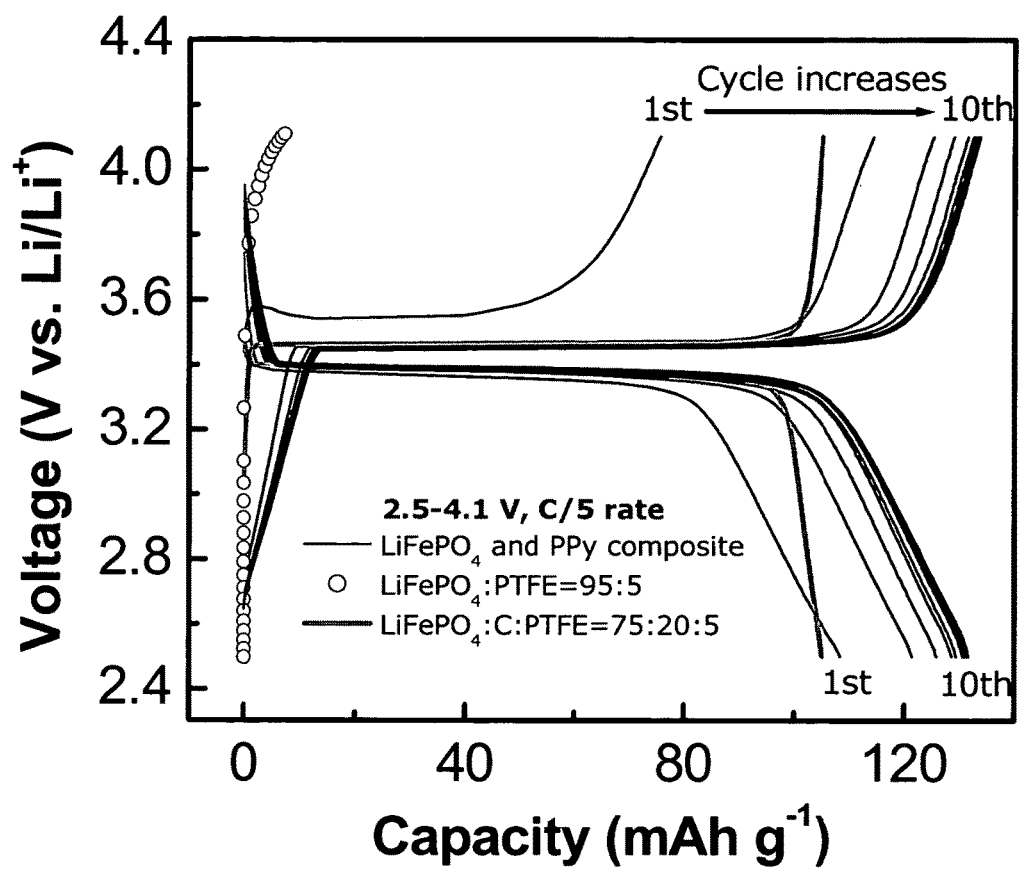
FIG. 5 is a graph that compares the charge/discharge voltage verses the state of charge curves with a Lithium anode at C/5 rate for C—$LiFePO_4$ with PPy against those of C—$LiFePO_4$ with PTFE and C—$LiFePO_4$ with C and PTFE in the weight ratio of about 75:20:5.
Figure 6:
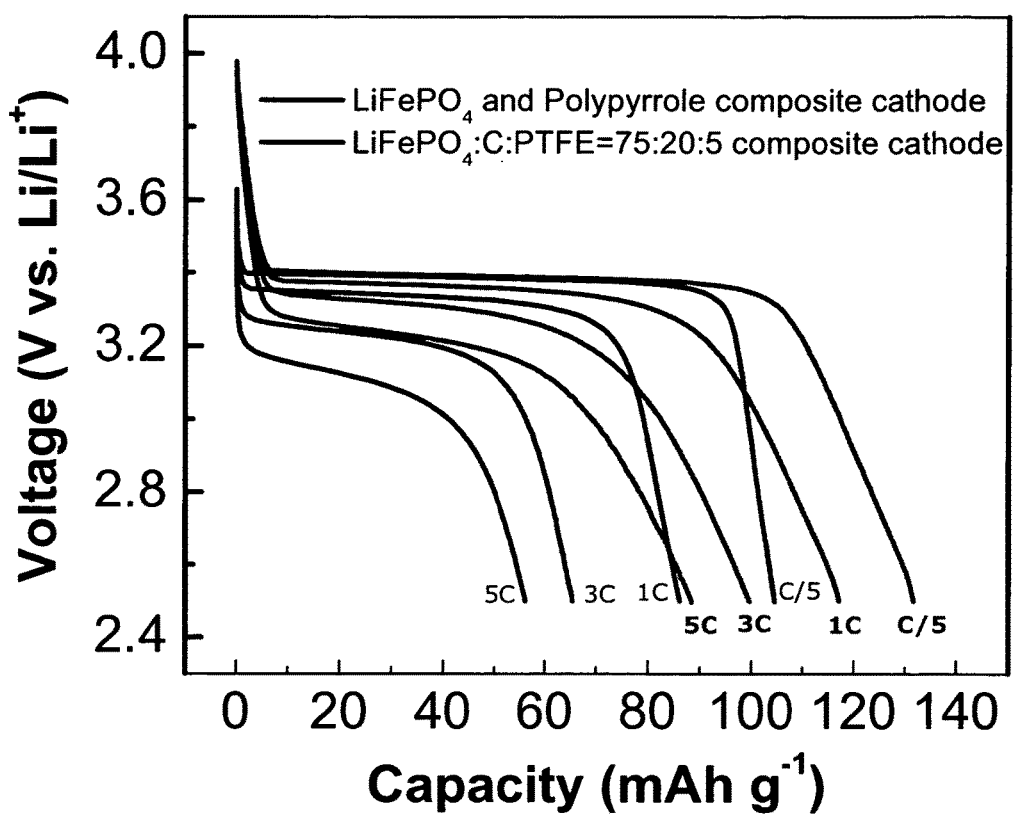
FIG. 6 is a graph that compares the voltage verses state of charge curves at different discharge rates after charging at C/5 rate with a Lithium anode for a cell having a C—$LiFePO_4$, PPy composite cathode with those for a cell having a 70:20:5 weight ratio C—$LiFePO_4$:C:PTFE composite cathode.
Figure 7:
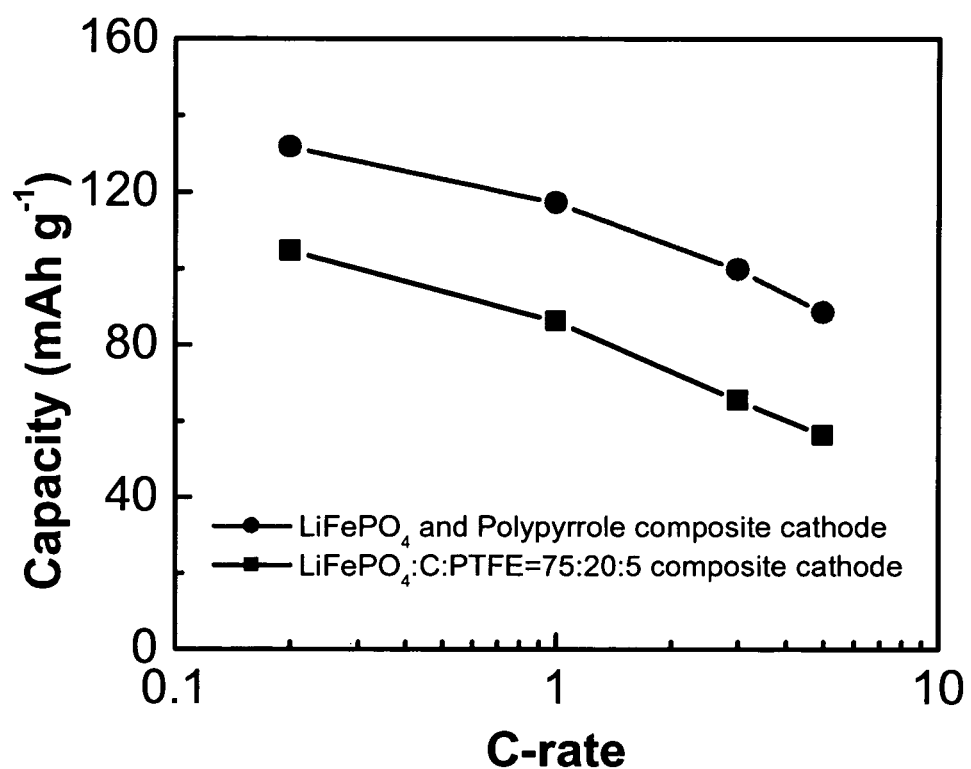
FIG. 7 is a graph that compares the capacities and reversible capacity loss between 2.5 and 4.1V of a C—$LiFePO_4$, PPy composite cathode with those of a 70:20:5 weight ratio C—$LiFePO_4$:C:PTFE composite cathode, each with a Lithium anode, at different C-rates of discharge after a charge at C/5 rate.

FIG. 4 is a SEM image of composition the $C$—$LiFePO_4$/PPy of the present invention. FIG. 5 is a graph that compares the charge/discharge voltage verses state of charge curve taken at 5/C rate of a cell having a $C$—$LiFePO_4$, PPy composite cathode of this invention with that of a conventional $C$—$LiFePO_4$:$C$:PTFE composite cathode. FIG. 6 is a graph that compares the voltage verses the state of charge curves taken on discharge at different rates after charging at C/5 rate of a cell having a $C$—$LiFePO_4$, PPy composite cathode of this invention with those of a cell having a conventional $C$—$LiFePO_4$:$C$:PTFE composite cathode. FIG. 7 is a graph that compares the capacities and reversible capacity loss between 2.5 and 4.1V of a $C$—$LiFePO_4$, PPy composite cathode with those of a 70:20:5 weight ratio $C$—$LiFePO_4$:$C$:PTFE composite cathode, each with a Lithium anode, at different C-rates of discharge after a charge at C/5 rate.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A cathode consisting essentially of:
   one or more carbon coated olivine $C$—$LiM(XO_4)$, wherein M is selected from Mn, Co, Ni or mixtures thereof and X is selected from Si, P, As, S or mixtures thereof and wherein the lithium is inserted/extracted reversibly into/from the one or more carbon coated olivine $C$—$LiM(XO_4)$; and
   a cathode filler material consisting essentially of an electronically conductive polymer of repeating units of substituted or unsubstituted monomers of aniline, thiophene, pyrrole, phenyl mercaptan, furan, [(ferrocenyl) amidopropyl] pyrrole or mixtures thereof,
   wherein the cathode filler material is attached to the one or more carbon coated olivine $C$—$LiM(XO_4)$, and
   wherein the electronically conductive polymer is a binder material.

2. The cathode of claim 1, wherein X is Si, As or S.

3. The cathode of claim 1, wherein X is P to form the carbon coated olivine $C$—$LiM(PO_4)$.

4. The cathode of claim 1, wherein the lithium content is variable.

5. The cathode of claim 1, wherein the electronically conductive polymer comprises conjugated regions.

6. The cathode of claim 5, wherein the electronically conductive polymer comprises repeating units of substituted or unsubstituted monomers of thiophene, phenyl mercaptan, furan, pyrrole or mixtures thereof.

7. The cathode of claim 5, wherein the electronically conductive polymer comprises monomers which are ring-substituted with one or more straight or branched alkyl, alkoxy, or alkyloxylalkyl groups, which contain from 1 to 30 carbon atoms.

8. A rechargeable electrochemical cell comprising an anode, and the cathode of claim 1, in communication with an electrolyte.

9. The cathode of claim 1, wherein M is Mn and X is P, Si, As or S.

10. The cathode of claim 1, wherein M is Co and X is P, Si, As or S.

11. The cathode of claim 1, wherein M is Ni and X is P, Si, As or S.

12. The cathode of claim 1, wherein M is Mn and X is As or S.

13. The cathode of claim 1, wherein M is Co and X is As or S.

14. The cathode of claim 1, wherein M is Ni and X is As or S.

15. The cathode of claim 1, wherein M is Mn and X is P or Si.

16. The cathode of claim 1, wherein M is Co and X is P or Si.

17. The cathode of claim 1, wherein M is Ni and X is P or Si.

18. A cathode comprising:
a cathode filler material consisting essentially of an electronically conductive polymer obtained by polymerization of organic monomers of [(ferrocenyl)amidopropyl] pyrrole and pyrrole, wherein the electronically conductive polymer is a binder material,
electrically attached to one or more carbon coated olivine C—LiM(XO$_4$), wherein
M is selected from Fe, Mn, Co, Ni or mixtures thereof, and
X is selected from Si, P, As, S or mixtures thereof and wherein the lithium is inserted/extracted reversibly into/from the one or more carbon coated olivine C—LiM(XO$_4$).

19. A cathode comprising:
an electronically conductive polymer cathode filler material consisting essentially of pyrrole and [(ferrocenyl) amidopropyl] pyrrole in a ratio of about 50:50, and
carbon coated olivine C—LiM(XO$_4$) particles attached to the electronically conductive polymer cathode filler material, wherein M is selected from Fe, Mn, Co, Ni or mixtures thereof and X is selected from Si, P, As, S or mixtures thereof and wherein the lithium is inserted/extracted reversibly into/from the carbon coated olivine C—LiM(XO$_4$).

20. The cathode of claim 19, wherein the carbon coated olivine C—LiM(XO$_4$) particles eliminate the need for a polymer binder.

21. The cathode of claim 19, wherein the carbon coated olivine C—LiM(XO$_4$) particles and the electronically conductive polymer have a similar voltage range.

22. The cathode of claim 19, wherein the electronically conductive polymer conducts electrons and stores lithium-ions to provide additional capacity.

23. A cathode consisting essentially of:
one or more carbon coated olivine C—LiM(XO$_4$), wherein M is selected from Fe, Mn, Co, Ni or mixtures thereof and X is selected from Si, As, S or mixture thereof and wherein the lithium is inserted/extracted reversibly into/from the one or more carbon coated olivine C—LiM(XO$_4$); and
a cathode filler material consisting essentially of an electronically conductive polymer of repeating units of substituted or unsubstituted monomers of aniline, thiophene, pyrrole, phenyl mercaptan, furan, [(ferrocenyl) amidopropyl] pyrrole or mixtures thereof, attached to the one or more carbon coated olivine C—LiM(XO$_4$), wherein the electronically conductive polymer is a binder material.

* * * * *

UNITED STATES PATENT AND TRADEMARK OFFICE
CERTIFICATE OF CORRECTION

PATENT NO. : 10,290,868 B2
APPLICATION NO. : 11/447510
DATED : May 14, 2019
INVENTOR(S) : John B. Goodenough et al.

It is certified that error appears in the above-identified patent and that said Letters Patent is hereby corrected as shown below:

In the Claims

Column 8, Claim 1, Line 3 should read:
"wherein M is selected from Fe, Mn, Co, Ni or mixtures"

Column 10, Claim 23, Line 4 should read:
"thereof and X is selected from Si, As, S or mixtures"

Signed and Sealed this
Sixteenth Day of July, 2019

Andrei Iancu
*Director of the United States Patent and Trademark Office*